(12) United States Patent
Kong et al.

(10) Patent No.: US 12,113,692 B2
(45) Date of Patent: Oct. 8, 2024

(54) DATA TRANSMISSION CIRCUIT AND OPERATION METHOD THEREOF

(71) Applicant: SK hynix Inc., Gyeonggi-do (KR)

(72) Inventors: In Seok Kong, Gyeonggi-do (KR); Ki Yong Choi, Gyeonggi-do (KR); Dong Seok Kim, Gyeonggi-do (KR); Sung Mook Kim, Gyeonggi-do (KR); Se Won Kim, Gyeonggi-do (KR); Joo Won Oh, Gyeonggi-do (KR); Keun Jin Chang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 47 days.

(21) Appl. No.: 17/958,796

(22) Filed: Oct. 3, 2022

(65) Prior Publication Data

US 2023/0291672 A1  Sep. 14, 2023

(30) Foreign Application Priority Data

Mar. 8, 2022  (KR) .................... 10-2022-0029345

(51) Int. Cl.
*H04L 43/08* (2022.01)
*H04L 43/087* (2022.01)

(52) U.S. Cl.
CPC ................................ *H04L 43/087* (2013.01)

(58) Field of Classification Search
CPC . H04L 43/087; H04L 25/028; H01R 13/6461; G11C 7/1006; G11C 7/222; G11C 5/143
See application file for complete search history.

(56) References Cited

U.S. PATENT DOCUMENTS

| | | | | |
|---|---|---|---|---|
| 7,954,076 B2 * | 5/2011 | Tokuda | ............. | G01R 31/3016 |
| | | | | 716/108 |
| 8,964,879 B2 * | 2/2015 | Navid | ................. | H04L 1/0002 |
| | | | | 375/259 |
| 2012/0319741 A1 * | 12/2012 | Bosshart | ............ | H01L 23/5222 |
| | | | | 29/25.01 |

(Continued)

FOREIGN PATENT DOCUMENTS

| KR | 10-2013-0021278 A | 3/2013 |
|---|---|---|
| KR | 10-2021-0033056 A | 3/2021 |

OTHER PUBLICATIONS

Hae-Kang Jung et al., A Transmitter to Compensate for Crosstalk-Induced Jitter by Subtracting a Rectangular Crosstalk Waveform From Data Signal During the Data Transition Time in Coupled Microstrip Lines, IEEE Journal of Solid-State Circuits, Sep. 2012, p. 2068-2079, vol. 47, No. 9, IEEE.

(Continued)

*Primary Examiner* — Dac V Ha
(74) *Attorney, Agent, or Firm* — IP & T GROUP LLP

(57) ABSTRACT

A data transmission circuit may include a plurality of data transmission lines configured to transmit a victim data signal through a victim data transmission line, and transmit an adjacent data signal through an adjacent data transmission line disposed adjacent to the victim data transmission line; and a data input/output circuit configured to control a reference voltage level reflected into the victim data signal on the basis of data pattern information of the adjacent data signal, and compare the victim data signal to the reference voltage level and output the comparison result.

20 Claims, 4 Drawing Sheets

(56) References Cited

U.S. PATENT DOCUMENTS

2015/0071047 A1* 3/2015 Lee .................. H04B 3/32
370/201

OTHER PUBLICATIONS

Seon-Kyoo Lee et al., A 5 GB/s Single-Ended Parallel Receiver With Adaptive Crosstalk-Induced Jitter Cancellation, IEEE Journal of Solid-State Circuits, Sep. 2013, p. 2118-2127, vol. 48, No. 9, IEEE.
Cosimo Aprile et al., An Eight-Lane 7-GB/s/pin Source Synchronous Single-Ended RX With Equalization and Far-End Crosstalk Cancellation for Backplane Channels, IEEE Journal of Solid-State Circuits, Mar. 2018, p. 861-872, vol. 53, No. 3, IEEE.

* cited by examiner

DATA TRANSMISSION CIRCUIT AND OPERATION METHOD THEREOF

CROSS-REFERENCES TO RELATED APPLICATION

The present application claims priority under 35 U.S.C. § 119(a) to Korean patent application number 10-2022-0029345 filed on Mar. 8, 2022, which is incorporated herein by reference in its entirety.

BACKGROUND

1. Technical Field

Various embodiments of the present disclosure generally relate to a data transmission circuit and an operation method thereof, and more particularly, to a data transmission circuit capable of reducing an influence of cross-talk, and an operation method thereof.

2. Related Art

In general, a semiconductor integrated circuit including a semiconductor memory device receives a data signal, performs a desired operation, and outputs the result of the operation. These days, a semiconductor integrated circuit is required to process a large volume of data signals. Therefore, in order to transmit more data signals at once, the bandwidth of the semiconductor integrated circuit, i.e., the number of data transmission lines coupled to the semiconductor integrated circuit is gradually increased. However, the increase in the number of data transmission lines in a limited interface space has resulted in narrowing the space between the data transmission lines.

The data signals transmitted through the plurality of data transmission lines between which the space is narrowed are inevitably influenced by cross-talk. The cross-talk indicates that a data signal transmitted through a victim data transmission line is influenced by a data signal transmitted through an adjacent data transmission line disposed adjacent to the victim data transmission line. In other words, the data signal transmitted through the victim data transmission line among the plurality of data transmission lines is influenced by cross-talk caused by the data signal transmitted through the adjacent data transmission line. The cross-talk appears as a jitter in which the phase of a data signal transmitted through the victim data transmission line is changed or a glitch in which the magnitude of the data signal is changed. Therefore, the data signal transmitted through the victim data transmission line may not be normally transmitted as a desired data signal, due to the cross-talk. As a result, it is not possible to guarantee a stable data processing operation for the plurality of data signals transmitted through the plurality of transmission lines.

SUMMARY

In an embodiment of the present disclosure, a data transmission circuit may include: a plurality of data transmission lines configured to transmit a victim data signal through a victim data transmission line, and transmit an adjacent data signal through an adjacent data transmission line disposed adjacent to the victim data transmission line; and a data input/output circuit configured to control a reference voltage level reflected into the victim data signal on the basis of data pattern information of the adjacent data signal, and compare the victim data signal to the reference voltage level and output the comparison result.

In an embodiment of the present disclosure, an operation method of a data transmission circuit may include: transmitting a plurality of input data signals through a plurality of data transmission lines; detecting data pattern information of an adjacent data signal corresponding to a victim data signal among the plurality of input data signals; controlling a reference voltage level reflected into the victim data signal on the basis of the data pattern information; and outputting an output data signal on the basis of a victim data signal into which the reference voltage level is reflected.

DETAILED DESCRIPTION

Figure 1:
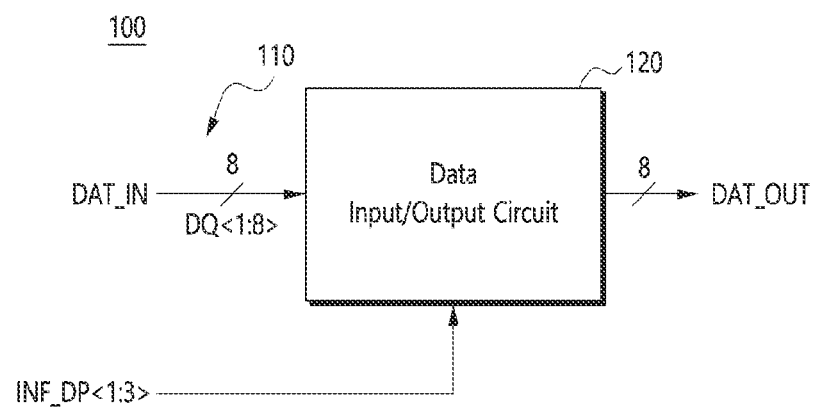
FIG. 1 is a block diagram illustrating a configuration of a data transmission circuit in accordance with an embodiment of the present disclosure.

The present disclosure provides structural and functional details directed to various embodiments. The scope of the invention, however, is not limited to or by any of the disclosed embodiments nor to any particular detail provided herein. That is, those skilled in the art will understand in view of the present disclosure that any embodiment may be modified in various ways and may have various forms. Accordingly, the invention encompasses all such variations that fall within the scope of the claims including their equivalents. Furthermore, an embodiment does not necessarily include all stated objects or effects nor include only such objects and effects. Accordingly, the scope of the invention is not limited thereby.

Throughout the specification, reference to "an embodiment" or the like is not necessarily to only one embodiment, and different references to any such phrase are not necessarily to the same embodiment(s). The term "embodiments" when used herein does not necessarily refer to all embodiments.

Terms, such as "first" and "second", are used to distinguish one element from another element that otherwise have the same or similar names. A first element in one instance may be named a second element in another instance without indicating any substantive change in the element itself.

The singular is intended to include the plural, unless clearly expressed otherwise or it is clear from the context that only one is intended. Open-ended terms such as "include" or "have" should be understood as indicating the existence of stated characteristics, numbers, steps, operations, elements, parts, or combination thereof, but not excluding the possibility that one or more other characteristics, numbers, steps, operations, elements, parts, or combination thereof are present or may be added.

In each of steps, symbols (e.g., a, b, and c) are used for convenience of a description, not necessarily to indicate any particular order of steps or operations. Consistent with the teachings herein, steps/operations may be performed in any suitable order, unless a specific order is clearly described or such order is indicated by the context. In some cases, two or more steps/operations may be performed substantially at the same time.

All the terms used herein, including technological or scientific terms, have the same meanings as typically understood by those skilled in the art, unless otherwise defined. Terms defined in commonly used dictionaries should be construed in the context of the related technology and should not be construed as ideal or in an excessively formal way, unless clearly defined in the application.

Various embodiments are directed to a data transmission circuit capable of controlling a reference voltage level reflected into a victim data signal among a plurality of data signals transmitted through a plurality of data transmission lines, and an operation method thereof.

In accordance with the embodiments, the data transmission circuit and the operating method thereof may control a reference voltage level reflected into a victim data signal, and remove cross-talk from a plurality of data signals transmitted through a plurality of data transmission lines.

FIG. 1 is a block diagram illustrating the configuration of a data transmission circuit 100 in accordance with an embodiment of the present disclosure.

Referring to FIG. 1, the data transmission circuit 100 may include a plurality of data transmission lines 110 and a data input/output circuit 120.

The plurality of data transmission lines 110 may include a victim data transmission line and an adjacent data transmission line disposed adjacent to the victim data transmission line. The plurality of data transmission lines 110 may be configured to transmit data through the victim data transmission line and the adjacent data transmission line. A data signal transmitted through the victim data transmission line may be defined as a 'victim data signal', and a data signal transmitted through the adjacent data transmission line may be defined as an 'adjacent data signal'. Hereafter, for convenience of description, the case in which the number of the data transmission lines 110 is eight will be taken as an example. In other words, the plurality of data transmission lines 110 may include first to eighth data transmission lines DQ<1:8>.

Although not illustrated in FIG. 1, the first to eighth data transmission lines DQ<1:8> may be sequentially arranged. Therefore, when a data transmission line located inside the edges, among the first to eighth data transmission lines DQ<1:8>, is defined as a victim data transmission line, the data transmission lines disposed adjacent to both sides of the victim data transmission line may be defined as adjacent data transmission lines. More specifically, when the victim data transmission line is the fourth data transmission line DQ<4>, for example, the adjacent data transmission lines may become the third and fifth data transmission lines DQ<3> and DQ<5>, respectively. On the other hand, when the data transmission line located at either edge, among the first to eighth data transmission lines DQ<1:8>, is defined as a victim data transmission line, the data transmission line disposed adjacent to one side of the victim data transmission line may be defined as an adjacent data transmission line. More specifically, when the victim data transmission line is the first data transmission line DQ<1>, for example, the adjacent data transmission line may become the second data transmission line DQ<2>.

In short, the plurality of data transmission lines 110 may transmit a plurality of input data signals DAT_IN including a victim data signal and adjacent data signals through the first to eighth data transmission lines DQ<1:8> including the victim data transmission line and the adjacent data transmission lines.

The data input/output circuit 120 may be configured to control a reference voltage level reflected into the victim data signal, on the basis of data pattern information INF_DP<1:3> of the adjacent data signal. Furthermore, the data input/output circuit 120 may be configured to compare the victim data signal to the reference voltage level, and output the comparison result. The data pattern information INF_DP<1:3> may include the transition states of the adjacent data signals.

Hereafter, the data pattern information INF_DP<1:3> will be described in more detail.

The data pattern information INF_DP<1:3> may be divided into first data pattern information INF_DP<1>, second data pattern information INF_DP<2>, and third data pattern information INF_DP<3>, for example. The first to third data pattern information INF_DP<1:3> may be each activated depending on the transition states of the adjacent data signals.

For example, when the victim data transmission line is the fourth data transmission line DQ<4>, the third and fifth data transmission lines DQ<3> and DQ<5> may both transition from a logic 'low' level to a logic 'high' level. That is, the adjacent data signals transmitted through the third and fifth data transmission lines DQ<3> and DQ<5>, respectively, may each include a rising edge corresponding to a first edge, for example. The first data pattern information INF_DP<1> may be activated when the adjacent data signals both include a rising edge. On the contrary, the third and fifth data transmission lines DQ<3> and DQ<5> may both transition from a logic 'high' level to a logic 'low' level. The adjacent data signals transmitted through the third and fifth data transmission lines DQ<3> and DQ<5>, respectively, may each include a falling edge corresponding to a second edge, for example. The second data pattern information INF_DP<2> may be activated when the adjacent data signals both include a falling edge. Besides, the adjacent data signals transmitted through the third and fifth data transmission lines DQ<3> and DQ<5> may include both a rising edge and a falling edge, or each include none of a rising edge and a falling edge. At this time, the third data pattern information INF_DP<3> may be activated.

For reference, in the data transmission circuit 100 in accordance with an embodiment, three pieces of data pattern information, i.e., the first to third data pattern information, have been applied according to the number of cases which may occur as the plurality of input data signals DAT_IN are driven from a logic 'high' level to a logic 'low' level. However, the data transmission circuit 100 in accordance with an embodiment may not be limited thereto. The number of the first to third data pattern information INF_DP<1:3> may be changed according to the number of logic levels to which the plurality of input data signals DAT_IN are driven. For example, when the input data signal DAT_IN has four logic levels, the number of data pattern information may be set to a larger number than three depending on the transition state of the input data signal DAT_IN.

As will be described below, the data input/output circuit 120 may control the reference voltage level reflected into the victim data signal, on the basis of the first to third data pattern information INF_DP<1:3>. Furthermore, the data input/output circuit 120 may compare the reference voltage level and the victim data signal, and output the comparison result as an output data signal DAT_OUT. The data input/output circuit 120 may control the reference voltage level for the comparison operation on the victim data signal transmitted with cross-talk reflected into the victim data signal, thereby removing the cross-talk reflected into the victim data signal.

The data transmission circuit 100 in accordance with an embodiment may remove cross-talk from the victim data signal into which the cross-talk has been reflected by the adjacent data signal, thereby generating the stable output data signal DAT_OUT corresponding to the victim data signal.

Figure 2:
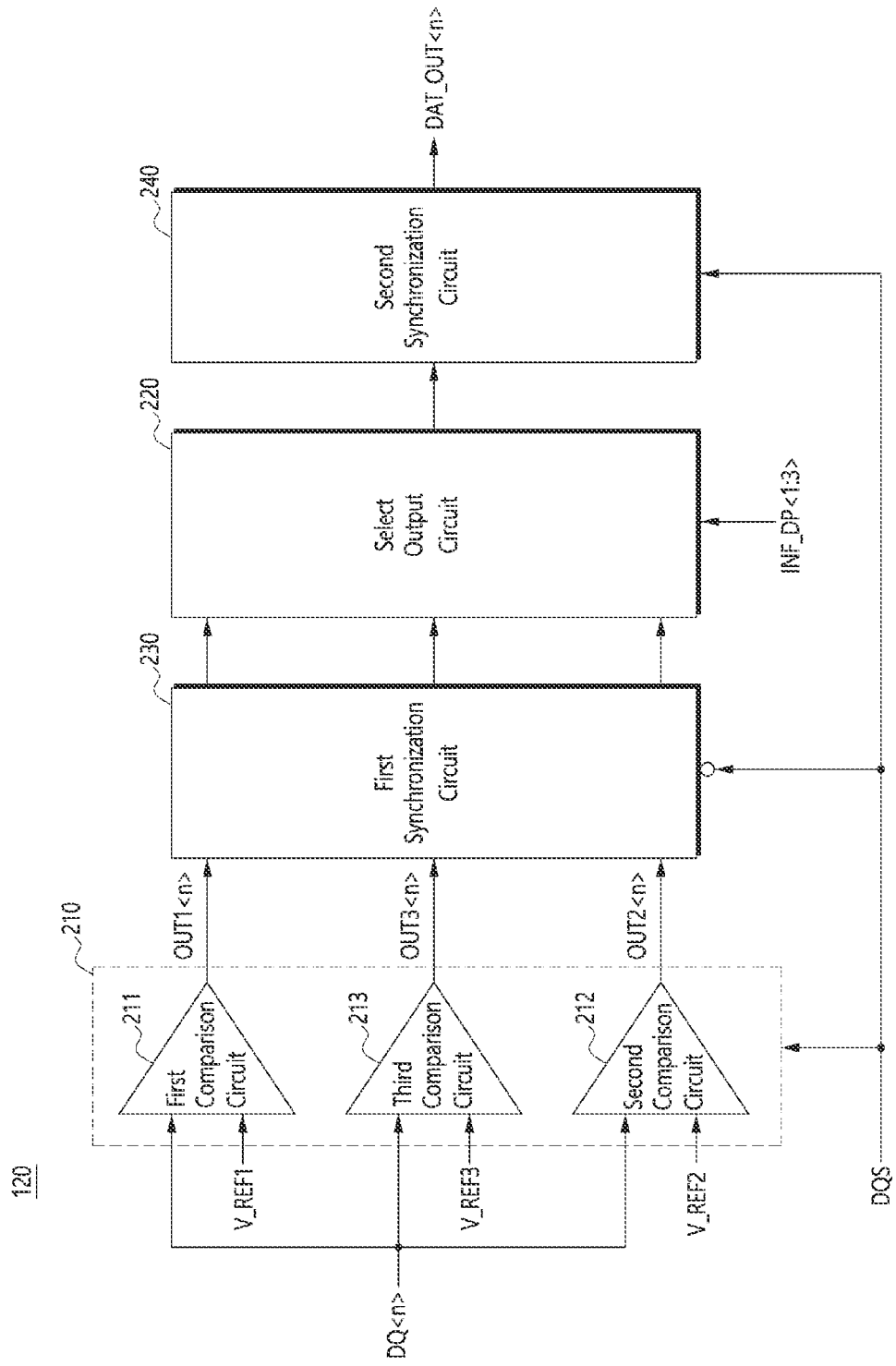
FIG. 2 is a block diagram illustrating a configuration of a data input/output circuit of FIG. 1 in accordance with an embodiment of the present disclosure.

FIG. 2 is a block diagram illustrating a configuration of the data input/output circuit 120 of FIG. 1 in accordance with an embodiment of the present disclosure.

Referring to FIG. 2, the data input/output circuit 120 may include a plurality of comparison circuits 210 and a select output circuit 220.

The plurality of comparison circuits 210 may be configured to compare a victim data signal to a plurality of reference voltages V_REF1, V_REF2, and V_REF3, and generate a plurality of output signals OUT1<n>, OUT2<n>, and OUT3<n> corresponding to the victim data signal, respectively. For convenience of description, the case in which three comparison circuits 210 are provided to correspond to the first to third data pattern information INF_DP<1:3> will be taken as an example. The plurality of comparison circuits 210 may include first to third comparison circuits 211 to 213.

The first to third comparison circuits 211 to 213 may be each coupled to a victim data transmission line DQ<n> through which the victim data signal is transmitted. Here, the victim data transmission line DQ<n> may include one of the first to eight data transmission lines DQ<1:8> of FIG. 1. For example, when the victim data transmission line DQ<n> is the fourth data transmission line DQ<4>, n may be set to 4.

Hereafter, the plurality of comparison circuits 210 will be described in more detail.

As described above, the plurality of comparison circuits 210 may be configured to generate the first to third output signals OUT1<n>, OUT2<n>, and OUT3<n> by comparing the victim data signal transmitted through the victim data transmission line DQ<n> to the first to third reference voltages V_REF1, V_REF2, and V_REF3, respectively. The plurality of comparison circuits 210 may include the first to third comparison circuits 211, 212, and 213.

The first comparison circuit 211 may be configured to compare the victim data signal and the first reference voltage V_REF1, and output the comparison result. More specifically, the first comparison circuit 211 may compare the victim data signal, transmitted through the victim data transmission line DQ<n>, to the first reference voltage VREF1. Then, the first comparison circuit 211 may output the comparison result as a first output signal OUT1<n>.

The second comparison circuit 212 may be configured to compare the victim data signal and the second reference voltage V_REF2, and output the comparison result. More specifically, the second comparison circuit 212 may compare the victim data signal, transmitted through the victim data transmission line DQ<n>, to the second reference voltage VREF2. Then, the second comparison circuit 212 may output the comparison result as a second output signal OUT2<n>.

The third comparison circuit 213 may be configured to compare the victim data signal and the third reference voltage V_REF3, and output the comparison result. More specifically, the third comparison circuit 213 may compare the victim data signal, transmitted through the victim data transmission line DQ<n>, to the third reference voltage VREF3. Then, the third comparison circuit 213 may output the comparison result as a third output signal OUT3<n>.

The first to third reference voltages V_REF1, V_REF2, and V_REF3 may have different voltage levels. Then, as will be described below in the description of a circuit operation, the first reference voltage VREF1 may correspond to a first edge of the adjacent data signal, i.e., a rising edge, and the second reference voltage V_REF2 may correspond to a second edge of the adjacent data signal, i.e., a falling edge. The voltage level of the second reference voltage V_REF2 may be lower than the voltage level of the first reference voltage V_REF1. The third reference voltage V_REF3 may correspond to the case in which the victim data signal has no cross-talk. The third reference voltage V_REF3 may have a voltage level between the voltage level of the first reference voltage V_REF1 and the voltage level of the second reference voltage V_REF2.

The select output circuit 220 may be configured to selectively control outputs of the first to third output signals OUT1<n>, OUT2<n>, and OUT3<n> on the basis of the first to third data pattern information INF_DP<1:3>. The select output circuit 220 may selectively output an output data signal DAT_OUT<n> corresponding to the victim data transmission line DQ<n>.

As described above, the first data pattern information INF_DP<1> may be activated when the adjacent data signal includes a rising edge, and the second data pattern information INF_DP<2> may be activated when the adjacent data signals include a falling edge. The third data pattern information INF_DP<3> may be activated when the adjacent data signals include both a rising edge and a falling edge or includes none of a rising edge and a falling edge.

Therefore, the select output circuit 220 may selectively output the first output signal OUT1<n>, which is an output signal of the first comparison circuit 211, on the basis of the first data pattern information INF_DP<1>. Furthermore, the select output circuit 220 may selectively output the second output signal OUT2<n>, which is an output signal of the second comparison circuit 212, on the basis of the second data pattern information INF_DP<2>. Furthermore, the select output circuit 220 may selectively output the third output signal OUT3<n>, which is an output signal of the third comparison circuit 213, on the basis of the third data pattern information INF_DP<3>.

The data transmission circuit 100 in accordance with the embodiment may selectively output the first to third output signals OUT1<n>, OUT2<n>, and OUT3<n> on the basis of the first to third data pattern information INF_DP<1:3>. The data transmission circuit 100 may reflect the first to third reference voltages V_REF1, V_REF2, and V_REF3 during the comparison operation on the victim data signal. The data transmission circuit 100 may selectively output one output signal of the first to third output signals OUT1<n>, OUT2<n>, and OUT3<n> on the basis of the transition states of the adjacent data signals, included in the first to third data pattern information INF_DP<1:3>. Therefore, the data transmission circuit 100 may control the first to third reference voltages V_REF1, V_REF2, and V_REF3 reflected into the victim data signal or the adjacent data signal(s), and output the victim data signal or the adjacent data signal(s), into which cross-talk has been reflected, as the output data signal DAT_OUT<n> or DAT_OUT<n+1> from which the cross-talk has been removed.

The data input/output circuit 120 may include a first synchronization circuit 230 and a second synchronization circuit 240.

The first synchronization circuit 230 may be configured to synchronize the first to third output signals OUT1<n>, OUT2<n>, and OUT3<n>, outputted from the plurality of comparison circuits 210, with a data strobe signal DQS, and output the synchronized signals. The second synchronization circuit 240 may be configured to synchronize the output signal of the select output circuit 220 with the data strobe signal DQS, and output the synchronized signal as the output data signal DAT_OUT<n>. The data strobe signal DQS may toggle in response to each of the input data signals DAT_IN (see FIG. 1) which are consecutively inputted. Therefore, the data transmission circuit 100 may control sequential circuit operations on the basis of the data strobe signal DQS.

For example, comparison operations of the plurality of comparison circuits 210 may be enabled on the basis of rising edges of the data strobe signal DQS. An output operation of the first synchronization circuit 230 may be enabled on the basis of a falling edge of the data strobe signal DQS. An output operation of the second synchronization circuit 240 may be enabled on the basis of a rising edge of the data strobe signal DQS.

The data transmission circuit 100 in accordance with an embodiment may include the first and second synchronization circuits 230 and 240. The data transmission circuit 100 may perform sequential circuit operations corresponding to the respective input data signals DAT_IN on the basis of the data strobe signal DQS.

For reference, the first and second synchronization circuits 230 and 240 may each have a configuration corresponding to SDR (Single Data Rate). Depending on design, at least one of the first and second synchronization circuits 230 and 240 may be included. For example, in a configuration corresponding to DDR (Double Data Rate), the first synchronization circuit 230 may be removed, and only the second synchronization circuit 240 may be included. At this time, the second synchronization circuit 240 may perform a synchronization operation on the basis of the inverted data strobe signal DQS.

The data transmission circuit 100 in accordance with an embodiment may include a pattern information generation circuit 300 configured to generate the first to third data pattern information INF_DP<1:3>.

Figure 3:
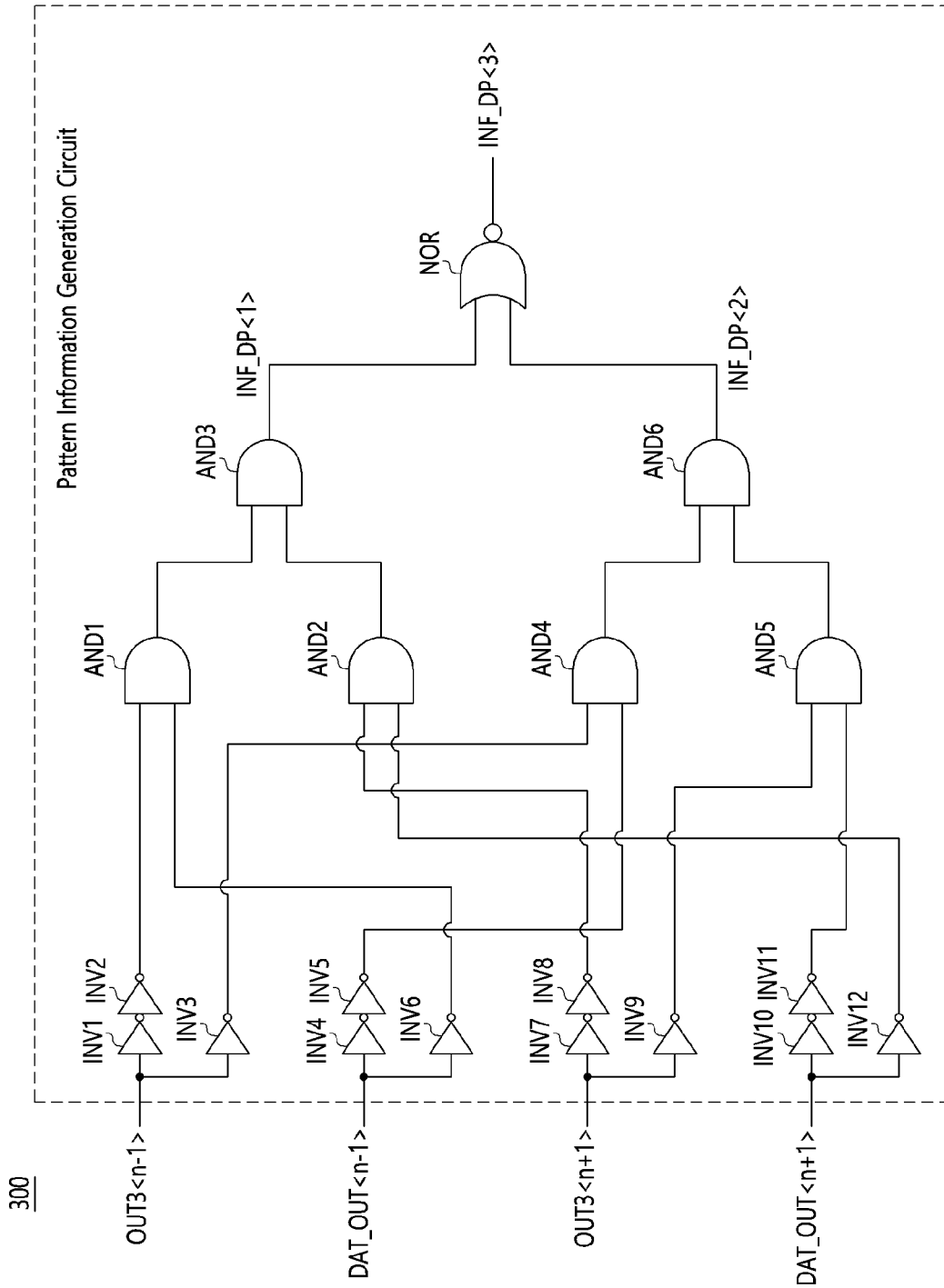
FIG. 3 is a circuit diagram illustrating the configuration of a pattern information generation circuit of the data transmission circuit in accordance with the embodiment of the present disclosure.

FIG. 3 is a circuit diagram illustrating the configuration of the pattern information generation circuit 300 of the data transmission circuit 100 in accordance with the embodiment of the present disclosure.

Referring to FIGS. 2 and 3, the pattern information generation circuit 300 may be configured to detect the transition states of adjacent data signals on the basis of output signals of the plurality of comparison circuits 210 and an output signal of the select output circuit 220. Furthermore, the pattern information generation circuit 300 may be configured to detect the transition states of the adjacent data signals, and generate the first to third data pattern information INF_DP<1:3>. The pattern information generation circuit 300 may include first to 12th inverting circuits INV1 to INV12, first to sixth AND circuits AND1 to AND6, and a NOR circuit NOR.

Hereafter, for convenience of description, adjacent data transmission lines disposed adjacent to a victim data transmission line DQ<n> (see FIG. 2) through which a victim data signal is transmitted are defined as 'DQ<n−1>' and 'DQ<n+1>'. Here, DQ<n−1> represents a 'first adjacent data transmission line', and DQ<n+1> represents a 'second adjacent data transmission line'. For example, when the victim data transmission line DQ<n> is the fourth data transmission line, the first adjacent data transmission line DQ<n−1> may become the third data transmission line, and the second adjacent data transmission line DQ<n+1> may become the fifth data transmission line. For reference, a component such as the data input/output circuit 120 of FIG. 2 may be coupled to each of the first and second adjacent data transmission lines DQ<n−1> and DQ<n+1>.

Referring to FIGS. 2 and 3, the specific configuration of the pattern information generation circuit 300 will be described as follows.

The first inverting circuit INV1 may receive a third output signal OUT3<n−1> corresponding to the first adjacent data transmission line DQ<n−1>, and invert the received signal and output the inverted signal. The second inverting circuit INV2 may receive the output signal of the first inverting circuit INV1, and invert the received signal and output the inverted signal. The third inverting circuit INV3 may receive the third output signal OUT3<n−1> corresponding to the first adjacent data transmission line DQ<n−1>, and invert the received signal and output the inverted signal. The fourth inverting circuit INV4 may receive an output data signal DAT_OUT<n−1> corresponding to the first adjacent data transmission line DQ<n−1>, and invert the received signal and output the inverted signal. The fifth inverting circuit INV5 may receive an output signal of the fourth inverting circuit INV4, and invert the received signal and output the inverted signal. The sixth inverting circuit INV6 may receive the output data signal DAT_OUT<n−1> corresponding to the first adjacent data transmission line DQ<n−1>, and invert the received signal and output the inverted signal.

The seventh inverting circuit INV7 may receive a third output signal OUT3<n+1> corresponding to the second adjacent data transmission line DQ<n+1>, and invert the received signal and output the inverted signal. The eighth inverting circuit INV8 may receive the output signal of the seventh inverting circuit INV7, and invert the received signal to output an inverted signal. The ninth inverting circuit INV9 may receive the third output signal OUT3<n+1> corresponding to the second adjacent data transmission line DQ<n+1>, and invert the received signal and output the inverted signal. The tenth inverting circuit INV10 may receive an output data signal DAT_OUT<n+1> corresponding to the second adjacent data transmission line DQ<n+1>, and invert the received signal and output the inverted signal. The 11th inverting circuit INV11 may receive the output signal of the tenth inverting circuit INV10, and invert the received signal and output the inverted signal. The 12th inverting circuit INV12 may receive the output data signal DAT_OUT<n+1> corresponding to the second adjacent data transmission line DQ<n+1>, and invert the received signal and output the inverted signal.

The first AND circuit AND1 may receive the output signals of the second and sixth inverting circuits INV2 and INV6, perform an AND operation on the received signals, and output the operation result. The second AND circuit AND2 may receive the output signals of the eighth and 12th inverting circuits INV8 and INV12, perform an AND operation on the received signals, and output the operation result. The third AND circuit AND3 may receive the output signals of the first and second AND circuits AND1 and AND2, perform an AND operation on the received signals, and output the operation result. The output signal of the third AND circuit AND3 may be outputted as the first data pattern information INF_DP<1>. The first data pattern information INF_DP<1> may be activated to a logic 'high' level, when the data signals transmitted through the first and second adjacent data transmission lines DQ<n−1> and DQ<n+1>, respectively, each include a rising edge.

The fourth AND circuit AND4 may receive the output signals of the third and fifth inverting circuits INV3 and INV5, perform an AND operation on the received signals, and output the operation result. The fifth AND circuit AND5 may receive the output signals of the ninth and 11th inverting circuits INV9 and INV11, perform an AND operation on the received signals, and output the operation result. The sixth AND circuit AND6 may receive the output signals of the fourth and fifth AND circuits AND4 and AND5, perform an AND operation on the received signals, and output the operation result. The output signal of the sixth AND circuit AND6 may be outputted as the second data pattern information INF_DP<2>. The second data pattern information INF_DP<2> may be activated to a logic 'high' level, when the data signals transmitted through the first and second adjacent data transmission lines DQ<n−1> and DQ<n+1>, respectively, each include a falling edge.

The NOR circuit NOR may receive the output signal of the third AND circuit AND3 and the output signal of the sixth AND circuit AND6, perform a NOR operation on the received signals, and output the operation result. The NOR circuit NOR may output the third data pattern information INF_DP<3> on the basis of the first data pattern information INF_DP<1> and the second data pattern information INF_DP<2>. The third data pattern information INF_DP<3> may be activated to a logic 'high' level, when the data signals transmitted through the first and second adjacent data transmission lines DQ<n−1> and DQ<n+1>, respectively, include both a rising edge and a falling edge, or each include none of a rising edge and a falling edge.

Hereafter, referring to FIGS. 1 to 3, the operation of the data transmission circuit 100 in accordance with an embodiment will be described. For convenience of description, the fourth data transmission line DQ<4> is defined as a victim data transmission line. Therefore, the third and fifth data transmission lines DQ<3> and DQ<5> may be defined as adjacent data transmission lines.

The data input/output circuit 120 of FIG. 1 may receive the plurality of input data signals DAT_IN through the third and fourth data transmission lines DQ<3:4>. The first to third comparison circuits 211 to 213 of FIG. 2 may compare the data signal, transmitted through the fourth data transmission line DQ<4> serving as the victim data transmission line DQ<n>, to the first to third reference voltages V_REF1 to V_REF3, and output the comparison results as first to third output signals OUT1<4>, OUT2<4>, and OUT3<4>, respectively.

At this time, the pattern information generation circuit 300 of FIG. 3 may generate the first to third data pattern information INF_DP<1:3> on the basis of the output data signal DAT_OUT<3> of the third data transmission line DQ<3> corresponding to a previous adjacent data signal, the third output signal OUT3<3> of the third data transmission line DQ<3> corresponding to a current adjacent data signal, the output data signal DAT_OUT<5> of the fifth data transmission line DQ<5> corresponding to a previous adjacent data signal, and the fifth output signal OUT3<5> of the fifth data transmission line DQ<5> corresponding to a current adjacent data signal transmitted.

Hereafter, operations based on three cases for the adjacent data signals will be described.

First, the case in which the adjacent data signals transmitted through the third and fifth data transmission lines DQ<3> and DQ<5> both include a rising edge will be described. In this case, the pattern information generation circuit 300 may generate the first data pattern information INF_DP<1> having a logic 'high' level. Therefore, the select output circuit 220 of FIG. 2 corresponding to the fourth data transmission line DQ<4> may selectively output the first output signal OUT1<4> on the basis of the first data pattern information INF_DP<1>. The victim data signal in which cross-talk has occurred transmitted through the fourth data transmission line DQ<4> may be outputted as the first output signal OUT1<4> into which the first reference voltage V_REF1 higher than the third reference voltage V_REF3 corresponding to a normal state is reflected by the first comparison circuit 211. At this time, the first output signal OUT1<4> outputted through the comparison operation based on the first reference voltage V_REF1 may become a signal from which the cross-talk caused by a rising edge of the adjacent data signal has been removed. Furthermore, the select output circuit 220 may output the first output signal OUT1<4> as the output data signal DAT_OUT<4>.

For reference, the victim data signal may form a higher voltage level than in the normal state, due to a rising edge of the adjacent data signal. Therefore, the data transmission circuit 100 in accordance with the present embodiment may reflect the first reference voltage V_REF1 higher than in the normal state during the comparison operation on the victim data signal having a high voltage level, thereby removing the influence of the cross-talk.

Second, the case in which the adjacent data signals transmitted through the third and fifth data transmission lines DQ<3> and DQ<5> both include a falling edge will be described. In this case, the pattern information generation circuit 300 may generate the second data pattern information INF_DP<2> having a logic 'high' level. Therefore, the select output circuit 220 of FIG. 2, corresponding to the fourth data transmission line DQ<4>, may selectively output the second output signal OUT2<4> on the basis of the second data pattern information INF_DP<2>. The victim data signal in which cross-talk has occurred transmitted through the fourth data transmission line DQ<4> may be outputted as the second output signal OUT2<4> into which the second reference voltage V_REF2 lower than the third reference voltage V_REF3 corresponding to a normal state is reflected by the second comparison circuit 212. At this time, the second output signal OUT2<4> outputted through the comparison operation based on the second reference voltage V_REF2 may become a signal from which the cross-talk caused by a falling edge of the adjacent data signal has been removed. The select output circuit 220 may output the second output signal OUT2<4> as the output data signal DAT_OUT<4>.

For reference, the victim data signal may form a lower voltage level than in the normal state, due to the falling edge of the adjacent data signal. Therefore, the data transmission circuit 100 in accordance with an embodiment may reflect the second reference voltage V_REF2 lower than in the normal state during the comparison operation on the victim data signal having a low voltage level, thereby removing the influence of the cross-talk.

Third, the case in which the adjacent data signals transmitted through the third and fifth data transmission lines DQ<3> and DQ<5> include a rising edge and a falling edge, or each include none of a rising edge and a falling edge will be described. In this case, the pattern information generation circuit 300 may generate the third data pattern information INF_DP<3> having a logic 'high' level. Therefore, the select output circuit 220 of FIG. 2, corresponding to the fourth data transmission line DQ<4>, may selectively output the third output signal OUT3<4> on the basis of the third data pattern information INF_DP<3>. The select output circuit 220 may output the third output signal OUT3<4> as the output data signal DAT_OUT<4>.

The data transmission circuit 100 in accordance with an embodiment may control the reference voltage level reflected into the victim data signal according to the transition states of the adjacent data signals, thereby removing the cross-talk reflected into the victim data signal.

The pattern information generation circuit 300 of FIG. 3 has detected the transition states of the currently inputted adjacent data signals by using the third output signals OUT3<n−1> and OUT3<n+1> corresponding to the adjacent data transmission lines DQ<n−1> and DQ<n+1>. However, the data transmission circuit 100 in accordance with an embodiment is not limited thereto. The data transmission circuit 100 may utilize the output signal of the first synchronization circuit 230, for example, or utilize the adjacent data signals which are currently inputted through the adjacent data transmission lines DQ<n−1> and DQ<n+1>, instead of the third output signals OUT3<n−1> and OUT3<n+1>. Furthermore, the pattern information generation circuit 300 has detected the transition states of the previously inputted adjacent data signals by using the DAT_OUT<n+1> output data signals DAT_OUT<n−1> and corresponding to the adjacent data transmission lines DQ<n−1> and DQ<n+1>. However, the data transmission circuit 100 in accordance with an embodiment is not limited thereto. The data transmission circuit 100 may utilize the adjacent data signals which have been previously inputted through the adjacent data transmission lines DQ<n−1> and DQ<n+1>, for example, instead of the output data signals DAT_OUT<n−1> and DAT_OUT<n+1>.

As described above, the victim data transmission line may be the data transmission line located at either edge among the first to eighth data transmission lines DQ<1:8>. In this case, the pattern information generation circuit 300 of FIG. 3 may set a preset logic level to an absent data transmission line. The absent data transmission line may indicate a virtual data transmission line which does not exist. For example, when the first data transmission line DQ<1> is defined as the victim data transmission line, the absent data transmission line may be defined as 'DQ<0>'. Thus, the third output signal OUT3<0> corresponding to the first adjacent data transmission line DQ<0> and the output data signal DAT_OUT<0> corresponding to the first adjacent data transmission line DQ<0>, which are inputted to the pattern information generation circuit 300, may be set to a logic 'high' level, for example.

On the other hand, when the victim data transmission line is the fourth data transmission line DQ<4>, for example, as described above, the adjacent data transmission lines may become the third and fifth data transmission lines DQ<3> and DQ<5>. When the adjacent data signals of the third and fifth data transmission lines DQ<3> and DQ<5> both include a rising edge, the first data pattern information INF_DP<1> may be activated. When the adjacent data signals of the third and fifth data transmission lines DQ<3> and DQ<5> both include a falling edge, the second data pattern information INF_DP<2> may be activated. However, cross-talk may be caused even by an adjacent data signal transmitted through one adjacent data transmission line disposed on one side of the victim data transmission line. The previous data signal and the current data signal of the third data transmission line DQ<3> may be retained in the same state, and a rising edge or falling edge may be included only in the fifth data transmission line DQ<5>.

In this case, the pattern information generation circuit 300 of FIG. 3 may be changed in design, such that the data transmission circuit 100 in accordance with an embodiment can control the reference voltage level. The data transmission circuit 100 may control the reference voltage level by activating the first data pattern information INF_DP<1> when a rising edge is included only in the fifth data transmission line DQ<5>. Furthermore, the data transmission circuit 100 may control the reference voltage level by activating the second data pattern information INF_DP<2> when a falling edge is included only in the fifth data transmission line DQ<5>.

Figure 4:
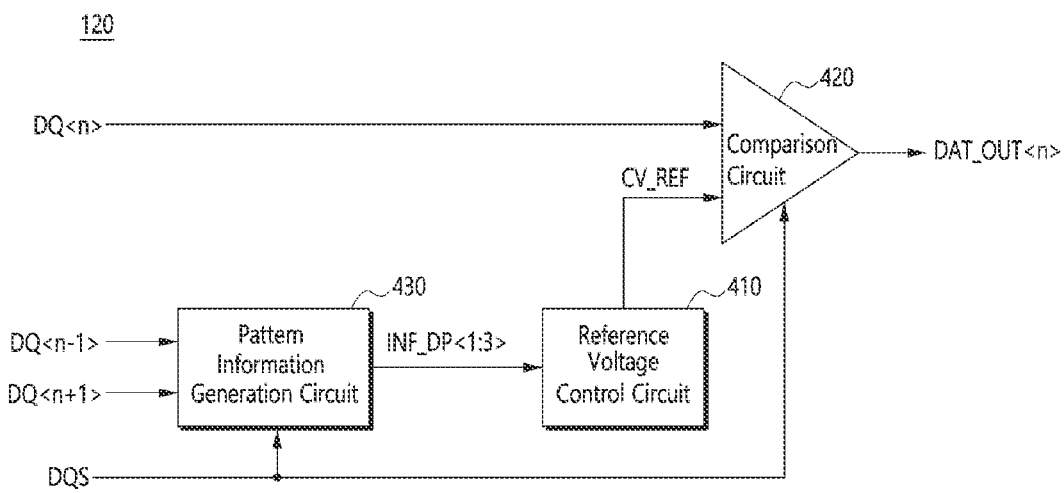
FIG. 4 is a block diagram illustrating a configuration of the data input/output circuit of FIG. 1 in accordance with an embodiment of the present disclosure.

FIG. 4 is a block diagram illustrating a configuration of the data input/output circuit 120 of FIG. 1 in accordance with an embodiment of the present disclosure.

Referring to FIG. 4, the data input/output circuit 120 may include a reference voltage control circuit 410 and a comparison circuit 420.

The reference voltage control circuit 410 may be configured to control the voltage level of a reference voltage CV_REF on the basis of the first to third data pattern information INF_DP<1:3>. As described above, the first to third data pattern information INF_DP<1:3> may include the transition states of adjacent data signals. The reference voltage CV_REF may have voltage levels corresponding to the first to third data pattern information INF_DP<1:3>.

More specifically, the reference voltage control circuit 410 may control the voltage level of the reference voltage CV_REF to a voltage level corresponding to the first reference voltage V_REF1 of FIG. 2, on the basis of the first data pattern information INF_DP<1>. Furthermore, the reference voltage control circuit 410 may control the voltage level of the reference voltage CV_REF to a voltage level corresponding to the second reference voltage V_REF2 of FIG. 2, on the basis of the second data pattern information INF_DP<2>. Furthermore, the reference voltage control circuit 410 may control the voltage level of the reference voltage CV_REF to a voltage level corresponding to the third reference voltage V_REF3 of FIG. 2, on the basis of the third data pattern information INF_DP<3>. Therefore, the reference voltage CV_REF may have the voltage level corresponding to the first reference voltage V_REF1 in response to a rising edge of an adjacent data signal. Furthermore, the reference voltage CV_REF may have the voltage level corresponding to the second reference voltage V_REF2 lower than the first reference voltage V_REF1 in response to a falling edge of the adjacent data signal.

The comparison circuit 420 may be configured to compare the victim data signal and the reference voltage CV_REF, and output the comparison result. The comparison circuit 420 may be coupled to the victim data transmission line DQ<n> corresponding to each of the first to eighth data transmission lines DQ<1:8> of FIG. 1. When the victim data transmission line DQ<n> is the fourth data transmission line DQ<4>, for example, as described with reference to FIG. 2, n may be set to 4. The comparison circuit 420 may generate the output data signal DAT_OUT<n> by comparing a victim data signal transmitted through the victim data transmission line DQ<n> to the reference voltage CV_REF.

The embodiment of FIG. 4 and the embodiment of FIG. 2 are different from each other in terms of the number of comparison circuits. The embodiment of FIG. 4 may include one comparison circuit 420, and the embodiment of FIG. 2 may include three comparison circuits, i.e., the first to third comparison circuits 211 to 213.

Referring back to FIG. 3, the pattern information generation circuit 300 may detect the currently inputted adjacent data signals and the previously inputted adjacent data signals of the adjacent data transmission lines DQ<n−1> and DQ<n+1>. The circuit configuration of the pattern information generation circuit 300 may be changed depending on design. In FIG. 4, the case in which adjacent data signals inputted through the adjacent data transmission lines DQ<n−1> and DQ<n+1> are utilized is taken as an example. A pattern information generation circuit 430 of FIG. 4 may generate the first to third data pattern information INF_DP<1:3> on the basis of the adjacent data signals inputted through the adjacent data transmission lines DQ<n−1> and DQ<n+1>. At this time, the pattern information generation circuit 430 may include a latch circuit (not illustrated) configured to perform a storage operation on the basis of the data strobe signal DQS, in order to detect the previously inputted adjacent data signals.

The data transmission circuit 100 in accordance with an embodiment may control the voltage level of the reference voltage CV_REF according to the adjacent data signals, thereby removing the cross-talk which occurred in the victim data signal.

Figure 5:
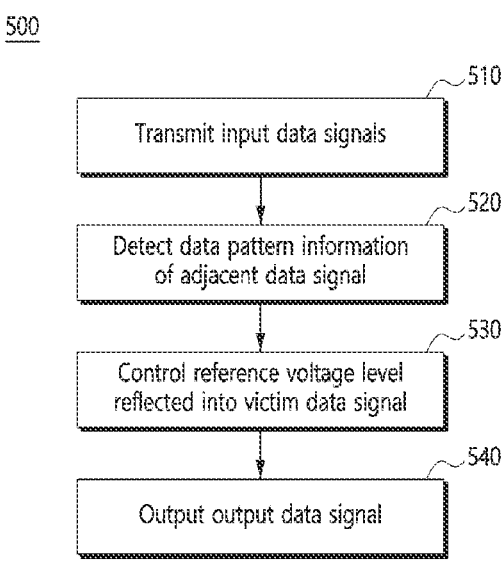
FIG. 5 is a flowchart illustrating an operation method of the data transmission circuit of FIG. 1 in accordance with an embodiment of the present disclosure.

FIG. 5 is a flowchart illustrating an operation method 500 of the data transmission circuit 100 of FIG. 1 in accordance with an embodiment of the present disclosure.

Referring to FIG. 5, the operation method 500 of the data transmission circuit 100 may include operation 510 of transmitting a plurality of input data signals, operation 520 of detecting data pattern information of adjacent data signals, operation 530 of controlling a reference voltage level reflected into a victim data signal, and operation 540 of outputting an output data signal.

The operation 510 of transmitting the plurality of input data signals may include receiving the plurality of input data signals through a plurality of data transmission lines. The operation 510 of transmitting the plurality of input data signals may be performed by the plurality of data transmission lines 110 through which the plurality of input data signals DAT_IN of FIG. 1 are transmitted.

The operation 520 of detecting the data pattern information of the adjacent data signal may include detecting data pattern information of the adjacent data signals corresponding to the victim data signal, among the plurality of input data signals DAT_IN. The operation 520 of detecting the data pattern information of the adjacent data signals may be performed by the pattern information generation circuit 300 of FIG. 3 or the pattern information generation circuit 430 of FIG. 4. As described with reference to FIGS. 3 and 4, the pattern information generation circuit 300 of FIG. 3 and the pattern information generation circuit 430 of FIG. 4 may detect the first to third data pattern information INF_DP<1:3> on the basis of the transition states of the adjacent data signals.

The operation 530 of controlling the reference voltage level reflected into the victim data signal may include controlling the reference voltage level reflected into the victim data signal on the basis of the first to third data pattern information INF_DP<1:3>. The operation 530 of controlling the reference voltage level reflected into the victim data signal may be performed by the data input/output circuit 120 of FIG. 2 and the reference voltage control circuit 410 of FIG. 4.

As described with reference to FIG. 2, the plurality of comparison circuits 210 of the data input/output circuit 120 may perform comparison operations by reflecting the first to third reference voltages V_REF1 to V_REF3 into the victim data signal. Furthermore, the select output circuit 220 of the data input/output circuit 120 may control a selection operation on the first to third output signals OUT1<n>, OUT2<n>, and OUT3<n> on the basis of the first to third data pattern information INF_DP<1:3>. As a result, the reference voltage level selected and controlled in response to the first to third data pattern information INF_DP<1:3> may be reflected into the output signal of the select output circuit 220. Then, as described with reference to FIG. 4, the reference voltage control circuit 410 may control the voltage level of the reference voltage CV_REF on the basis of the first to third data pattern information INF_DP<1:3>. The reference voltage CV_REF may have voltage levels corresponding to the first to third data pattern information INF_DP<1:3>.

The operation 540 of outputting the output data signal may include outputting the output data signal on the basis of a victim data signal into which the reference voltage level is reflected. The operation 540 of outputting the output data signal may be performed by the component for generating the output data signal DAT_OUT<n> in FIGS. 2 and 4.

The operation method 500 of the data transmission circuit 100 in accordance with an embodiment may control the reference voltage level reflected into the victim data signal on the basis of the first to third data pattern information INF_DP<1:3>, thereby removing cross-talk reflected into the plurality of input data signals DAT_IN.

While various embodiments have been described above, it will be understood by those skilled in the art that the embodiments described are examples only. Accordingly, the data transmission circuit and the operation method, which are described herein, should not be limited based on the described embodiments.

Although various embodiments have been described for illustrative purposes, it will be apparent to those skilled in the art that various changes and modifications may be made without departing from the spirit and scope of the invention as defined in the following claims. Furthermore, the embodiments may be combined to form additional embodiments.

What is claimed is:

1. A data transmission circuit comprising:
a data input/output circuit; and
a plurality of data transmission lines including a victim data transmission line and an adjacent data transmission line adjacent to the victim data transmission line, the victim data transmission line being configured to transmit a victim data signal to the data input/output circuit and the adjacent data transmission line being configured to transmit an adjacent data signal to the data input/output circuit,
wherein the data input/output circuit configured to:
control a reference voltage level to be reflected into the victim data signal on the basis of data pattern information of the adjacent data signal,
compare the victim data signal to the controlled reference voltage level; and
output a result of the comparison of the victim data signal to the controlled reference voltage level.

2. The data transmission circuit according to claim 1, wherein the data pattern information comprises a transition state of the adjacent data signal.

3. The data transmission circuit according to claim 1, wherein the data pattern information comprises:
   first data pattern information which is activated when the adjacent data signal includes a first edge; and
   second data pattern information which is activated when the adjacent data signal includes a second edge.

4. The data transmission circuit according to claim 1, wherein the data input/output circuit comprises:
   a plurality of comparison circuits configured to generate a plurality of output signals by comparing the victim data signal to the respective reference voltages; and
   a select output circuit configured to output one of the plurality of output signals on the basis of the data pattern information.

5. The data transmission circuit according to claim 4, wherein a number of the plurality of comparison circuits correspond to a number of pieces of the data pattern information.

6. The data transmission circuit according to claim 4, wherein the plurality of comparison circuits comprises:
   a first comparison circuit configured to compare the victim data signal to a first reference voltage and output a result of the comparing of the victim data signal to the first reference voltage;
   a second comparison circuit configured to compare the victim data signal to a second reference voltage and output a result of the comparing of the victim data signal to the second reference voltage; and
   a third comparison circuit configured to compare the victim data signal to a third reference voltage and output a result of the comparing of the victim data signal to the third reference voltage.

7. The data transmission circuit according to claim 6, wherein the first to third reference voltages have different voltage levels,
   wherein the first reference voltage corresponds to a first edge of the adjacent data signal, and
   wherein the second reference voltage has a lower voltage level than the first reference voltage and corresponds to a second edge of the adjacent data signal.

8. The data transmission circuit according to claim 6, wherein the select output circuit outputs:
   the output of the first comparison circuit on the basis of the data pattern information corresponding to a first edge of the adjacent data signal; and
   the output of the second comparison circuit on the basis of the data pattern information corresponding to a second edge of the adjacent data signal.

9. The data transmission circuit according to claim 4, further comprising one or more synchronization circuits configured to
   synchronize, with a data strobe signal, the output signals of the plurality of comparison circuits and the select output circuit, and
   output the synchronized signals.

10. The data transmission circuit according to claim 4, further comprising a pattern information generation circuit configured to:
   detect a transition state of the adjacent data signal; and
   generate the data pattern information on the basis of the output signals of the plurality of comparison circuits and the output signals of the select output circuit.

11. The data transmission circuit according to claim 1, wherein the data input/output circuit comprises:
   a reference voltage control circuit configured to control the reference voltage level on the basis of the data pattern information; and
   a comparison circuit configured to compare the victim data signal to the reference voltage level and output a result of the comparison of the victim data signal to the reference voltage level.

12. The data transmission circuit according to claim 11, wherein the reference voltage level has a first voltage level in response to a first edge of the adjacent data signal and has a second voltage level lower than the first voltage level in response to a second edge of the adjacent data signal.

13. The data transmission circuit according to claim 1, further comprising a pattern information generation circuit configured to
   detect a transition state of the adjacent data signal; and
   generate the data pattern information on the basis of the transition state of the adjacent data signal.

14. An operation method of a data transmission circuit, comprising:
   receiving a plurality of input data signals respectively through a plurality of data transmission lines;
   detecting data pattern information of an adjacent data signal corresponding to a victim data signal among the plurality of input data signals;
   controlling a reference voltage level to be reflected into the victim data signal on the basis of the data pattern information; and
   outputting an output data signal on the basis of the victim data signal into which the controlled reference voltage level is reflected.

15. The operation method according to claim 14, wherein the adjacent data signal is transmitted through an adjacent data transmission line disposed adjacent to a victim data transmission line to which the victim data signal is transmitted, among the plurality of data transmission lines.

16. The operation method according to claim 15, wherein the adjacent data transmission line comprises one or more data transmission lines disposed adjacent to the victim data transmission line.

17. The operation method according to claim 14, wherein the data pattern information comprises a transition state of the adjacent data signal.

18. The operation method according to claim 14, wherein the data pattern information comprises:
   first data pattern information which is activated when the adjacent data signal includes a first edge; and
   second data pattern information which is activated when the adjacent data signal includes a second edge.

19. The operation method according to claim 14, wherein the controlling of the reference voltage level comprises:
   comparing the victim data signal to a plurality of reference voltages to generate respective output signals; and
   outputting one of the output signals on the basis of the data pattern information.

20. An operating method of a data transmission circuit, the method comprising:
   raising a reference voltage level to be compared with a victim data signal according to one of rising and falling edges of at least one adjacent data signal; and
   lowering the reference voltage level according to the other one of the rising and falling edges of the at least one adjacent data signal,
   wherein the victim data signal and adjacent data signal are transmitted by data signal lines adjacent to each other.

* * * * *